United States Patent Office 3,137,745
Patented June 16, 1964

3,137,745
METHOD OF FORMING HOLLOW PLASTIC ARTICLES
Paul L. Johnstone, Wilmington, Del., assignor to Hercules Powder Company, Wilmington, Del., a corporation of Delaware
No Drawing. Filed Oct. 15, 1962, Ser. No. 230,725
6 Claims. (Cl. 264—54)

This invention relates to the manufacture of hollow shaped articles from polypropylene and more particularly to the production of hollow shaped articles from a cellular polypropylene material.

The manufacture of bottles and similar hollow articles by a process involving the extrusion of a tube or parison of plastic material and, while still in plastic condition, constricting the tube at one end and inflating it with air pressure is well known in the art. This process, commonly referred to as blow molding, is normally employed for the manufacture of hollow articles from plastic materials in an unexpanded condition. Many attempts have been made to blow mold expandable plastic compositions so as to obtain a hollow article, the walls of which have a cellular structure. These attempts have been unsuccessful because of the almost inevitable rupture of the internal cell walls by the expanding gas of the blowing agent and when pressure is applied to the extruded tube or parison in order to expand it into the form of a hollow object, the walls of the parison rupture and permit escape of the applied air pressure.

Now in accordance with this invention it has been discovered that hollow articles made of polypropylene foam can be produced by blowing a parison, the plastic composition of which comprises stereoregular polypropylene, a blowing agent, and an azido cross-linking agent. It was most unexpected that by extruding a parison from an expandable polypropylene composition that it would be possible to obtain walls of sufficient strength to enable the expansion of the parison without rupturing the parison wall. Bottles or other blown hollow articles of foamed polypropylene can be produced in accordance with this invention in which the density of the foam wall can be as low as 30 lb./cu. ft. or less and which have a uniform cell structure with at least 50% of the cells closed and preferably with more than 70% closed cells.

The plastic composition which is extruded into a parison and blown in accordance with this invention comprises a mixture or blend of stereoregular polypropylene, a blowing agent and an azido cross-linking agent. Any method of blending these components may be used. In the case of the chemical blowing agents, the azido cross-linking agent and the blowing agent may be mixed into a diluent such as acetone, which may also contain a stabilizer or other modifier for the polypropylene, and the polypropylene in finely divided form may then be added and mixed into a slurry. On evaporation of the diluent an intimate mixture of the polymer, cross-linking agent, and blowing agent is obtained which may then be used directly in the extruder. The azido cross-linking agent and the chemical blowing agent may also be blended in dry form with the powdered polymer by means of a high-speed mixer such as a Waring Blendor or Henschel mill. This dry mix may then be used directly in the extruder. When solvent types of blowing agents are employed, the stereoregular polypropylene and the azido cross-linking agent may be mixed and introduced into the extruder and the solvent blowing agent introduced directly into the extruder barrel through a vent generally located a short distance in front of the die of the extruder. In either case the temperature in the vicinity of the die of the extruder must be at least as high as the softening temperature of the mixture. The softening temperature of this mixture, or blend, will depend upon whether the blowing agent is a solvent type or a chemical type. Thus, with a solvent type, the polypropylene will at least partially dissolve so that the softening temperature of the blend can be as low as 135° C. On the other hand, with a chemical blowing agent, the softening temperature of the blend will be the melting point of the polymer and, hence, will be above about 165° C. Accordingly, the temperature within the extruder must be at least as high as the softening temperature of the mixture passing through the extruder. The exact temperature to be used for the total operation will depend upon the cross-linking and blowing agents used, the residence time in the extruder, etc. When the mixture of polypropylene, cross-linking agent, and blowing agent is heated in the extruder, particularly in the case of an extruder with a temperature gradient, blowing may be at least partially effected at the low temperature in the first zones of the extruder and cross-linking will be effected at the higher temperature in the final zones of the extruder, in which case the cross-linking is effected immediately prior to the expansion that takes place when the mass leaves the extruder at the die. It is essential that the cross-linking must have occurred at the time that expansion takes place at the die of the extruder or simultaneously therewith. Hence, the temperature in the final zone of the extruder must be sufficient to complete the cross-linking of the polypropylene and to release the gas from the blowing agent.

As the cellular parison emerges from the extruder die it is fed by gravity between the mold cavities in an open position. As the mold closes around the parison, one end is pinched to close the end and air pressure is then introduced which expands the parison to the shape of the mold cavity. The applied air pressure to expand the parison will be variable depending on the wall thickness of the parison and the extent to which it must be expanded to fill the mold cavity.

Any of the standard blow molding apparatus generally used for the manufacture of hollow articles may be used in producing the foam bottles of this invention.

Any stereoregular polypropylene may be used to prepare the foamed hollow articles in accordance with this invention, but generally polypropylenes having a reduced specific viscosity (RSV) of from about 1 to about 5 and, more preferably, about 2 to about 3, are used, said reduced specific viscosity being determined on a 0.1% solution of the polymer in decahydronaphthalene at a temperature of 135° C.

Any of the well-known chemical blowing agents may be used in the preparation of the foams used in accordance with this invention as, for example, azo bis(formamide), diazoaminobenzene, N,N'-dinitrosopentamethylene tetramine, N,N'-dimethyl-N,N'-dinitrosoterephthalamide, p,p'-oxy-bis(benzene sulfonyl semi-carbazide), azo bis(isobutyronitrile), p,p'-oxy-bis(benzene sulfonyl hydrazide), p,p'-diphenyl-bis(sulfonyl hydrazide), benzene-sulfonyl hydrazide, m-benzene-bis(sulfonyl hydrazide), etc. Any of the well-known solvent blowing agents may also be used in this invention, as for example, monochlorotrifluoromethane, monochlorodifluoromethane, dichlorotetrafluoroethylene, trichloroethylene, chloroform, carbon tetrachloride, and low boiling hydrocarbons such as butane, pentane, hexane, etc. Accordingly, any compound which decomposes or volatilizes to yield at least one mole of gas per mole of blowing agent at a temperature of 190° C. or less may be used.

Any azido cross-linking agent may be used in the preparation of the polypropylene foam used in this invention. Thus, any poly(sulfonazide), i.e., any compound having the general formula $$R[SO_2N_3]_x$$

where R is an organic radical inert to the cross-linking reaction and $x$ is an integer greater than 1, can be used in the process of this invention. Preferably, $x$ will be an integer from 2 to 100 and R will be selected from the group of organic radicals consisting of alkylene, arylene, aralkylene, and aralkylene radicals; however, these radicals can also contain ether, alcohol, halogen, etc., groups which are inert to the cross-linking reaction. Exemplary of the poly(sulfonazide)s that may be used are 1,7-heptane-bis(sulfonazide), 1,10-decane-bis(sulfonazide), 1,11-undecane - bis(sulfonazide), 1,12-dodecane-bis(sulfonazide), 7-oxa-tridecane-1,13-bis(sulfonazide), 6-thiaundecane-1,11-bis(sulfonazide); chloroaliphatic poly(sulfonazide)s such as the poly(sulfonazide) produced from a chloro- and sulfochlorinated mixture of petroleum hydrocarbons containing at least one chlorine atom and at least two sulfonazide groups per molecule;

1,9,18-octadecane-tris(sulfonazide),
poly(ethylene sulfonazide),
poly(sulfonazido-methyl styrene),
1,3- and 1,4-bis(sulfonazido-methyl benzene),
1,3-benzene bis(sulfonazide),
1-octyl-2,4,6-benzene tris(sulfonazide),
4,4'-diphenylmethane bis(sulfonazide),
4,4'-diphenyl ether bis(sulfonazide),
4,4'-bis-octadecyl biphenyl-3,5,3',5'-tetra(sulfonazide),
4,4'-diphenyl disulfide bis(sulfonazide),
1,6-bis(4'-sulfonazidophenyl) hexane,
2,7-naphthalene bis(sulfonazide), etc.

Another class of azido cross-linking agents that may be used are azidoformates which have the general formula

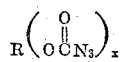

where $x$ is at least 1, preferably from about 1 to about about 100, and R is an organic radical, inert to cross-linking reactions, containing at least one carbon atom per azidoformate group. Exemplary of these azidoformates are the alkyl azidoformates such as n-octadecyl azidoformate, tetramethylene-bis(azidoformate), pentamethylene-bis(azidoformate); the cyclic alkyl azidoformates such as 2-(1-p-methyl-8-yloxy) ethyl azidoformate; the aromatic azidoformates such as phenyl azidoformate, $\alpha,\alpha'$-p-xylylene-bis(azidoformate), 2,2-isopropylidene-bis(p,p'-phenyl azodiformate); the azidoformate ethers such as 2,2' - oxydiethyl-bis(azidoformate), 2,2'-oxydipropyl-bis-(azidoformate), 2,2' - ethylenedioxydiethyl-bis(azidoformate), the tetraazidoformate of pentaerythritol-propylene oxide adduct, the azidoformate thioethers such as 2,2'-thiodiethyl-bis(azidoformate), 4,4'-thiodibutyl-bis(azidoformate); etc. Still another class of azido cross-linking agents that can be used are the aromatic polyazides having the general formula $R(N_3)_x$ where R is an aromatic grouping inert to the cross-linking reaction, and $x$ is an integer greater than 1. Preferably $x$ will be an integer from 2 to 200 and R will be selected from the group of organic radicals consisting of arylene and alkarylene radicals. Exemplary of the aromatic polyazides useful in this invention are m-phenylene diazide, 2,4,6-triazidobenzene, 4,4'-diphenyl diazide, 4,4'-diphenylmethane diazide, 4,4'-diazido diphenylamine, 4,4'-diazido diphenylsulfone, 2,7-diazidonaphthalene and 2,6-diazidoanthraquinone. Thus, any compound having at least one azido group in the molecule and preferably two or more can be used as the azido cross-linking agent to prepare the polypropylene foams used in this invention.

The amount of the azido cross-linking agent utilized in the preparation of these foams can be varied over a wide range. It must be an amount that is sufficient to prevent rupture of the cell walls when the foaming action takes place. Generally, it will be an amount of from about 0.01% for a final foam of 40 to 50 lbs./cu. ft. density up to about 2% by weight of the polymer for foams below 5 lbs./cu. ft. density, although higher concentrations can be used if desired. The amount of blowing agent incorporated will obviously depend upon the degree of blowing desired; that is, the density desired for the final foamed product and the types of blowing agent used.

Many variations can be made in the process of this invention and in the expandable compositions used in this invention without departing from the invention. Thus, there can be incorporated in the polypropylene used or in the preparation of the blends of polypropylene, blowing agent, and cross-linking agent, such additives as light and heat stabilizers for the polypropylene, dyestuffs and pigments, flame retardants, including organic and inorganic flame retardants, such as chlorinated paraffin wax, antimony oxide and other such materials, etc. For many applications it is desirable to increase the flexibility of the walls of the hollow articles by incorporating an elastomer in the composition used to form the parison. This may be done by mixing a synthetic or natural rubber with the blend of polypropylene, cross-linking agent, and blowing agent and extruding said mixture into a parison. The amount of elastomer incorporated will generally be below about 50% by weight of the polypropylene and preferably from about 5% to about 25%. Exemplary of the elastomers that can be so incorporated are ethylene-propylene copolymer rubbers, ethylene-propylene-diene terpolymer rubbers, polyisobutylene, etc. Many other variations will be apparent to those skilled in the art.

The following examples will illustrate the preparation of blown articles made of cross-linked polypropylene foams in accordance with this invention. All parts and percentages are by weight unless otherwise indicated.

*Example 1*

A mixture of 99.58 parts of stereoregular polypropylene having an RSV of 2.4, 0.38 part of azo bis(formamide) and 0.04 part of 1,10-decane-bis(sulfonylazide) was extruded through a 1.5-inch extruder of $L/D$ ratio of 24:1. The molten polymer blend passed through a tube-forming cross-head and then through an annular die attached to the cross-head. The land of the die was 1.6 inches long and $11/16$ inch inside diameter. The mandrel inside the die extended to the end of the die and had an outside diameter of $1/4$ inch. Thus, the die and mandrel were separated by an annulus whose width was $7/32$ inch. The temperature of the molten polymer blend as it passed through the cross-head was 182° C. The extruded tube, or parison, moved vertically downward between the opened halves of a 4 oz. Boston-round bottle mold. The bottle mold was jacketed and cooled with 18° C. water. After extruding a parison of suitable length, the extruder was stopped, the mold closed around the parison and air, at a pressure of 40 p.s.i., was blown through the die mandrel to expand the parison to the shape of the bottle mold. The mold was held closed for 45 seconds to cool the molded bottle which was then removed. The wall of the bottle so produced had a fine, uniform, cell structure with more than 70% of the cells closed and had a bulk density of 38 lbs./cu. ft.

Attempts to prepare bottles from a control foam where no cross-linker was used in the preparation of the foam failed due to rupture of the cell walls and blowing out of the wall of the parison. It was not possible to expand the parison to the shape of the bottle mold.

*Example 2*

A bottle was blown by the general procedure described in Example 1. In this case a mixture of 76.68 parts of a stereoregular polypropylene having an RSV of 2.4, 23 parts of a stereoregular polypropylene having an RSV of 2.7, 0.29 part of azo bis(formamide) and 0.03 part of 1,10-decane-bis(sulfonylazide) was extruded. The inside diameter of the die used in this example was $7/16$ inch instead of $11/16$ inch which reduced the annulus width to $3/16$ inch so as to make a thinner walled bottle. The parison was expanded with 15 p.s.i. pressure, and the bottle was cooled for 30 seconds before opening the mold.

The bottle so obtained was well formed, and the bottle wall had a bulk density of 32 lbs./cu. ft. with more than 70% of the cells closed.

*Example 3*

A bottle was blown by the general procedure described in Example 1. In this case a mixture of 90 parts of stereoregular polypropylene having an RSV of 2.5, 10 parts of polyisobutylene (molecular weight of about 100,000), 0.5 part of azo bis(formamide), 0.05 part of 1,10-decane-bis(sulfonazide), and 0.20 part of Santonox [4,4'-thiobis(6-tert-butyl-m-cresol)], as a stabilizer, was placed on a two roll mill at 165° C. and mixed for 10 minutes with repeated cross-cutting and end-rolling. The blend was then sheeted from the mill, cooled, and chopped into pellets.

These pellets were fed into the extruder and a parison was extruded and blown as described in Example 1. The wall of the bottle so produced had a uniform, fine, closed cell structure with more than 70% of the cells closed and an apparent density of 35 lbs./cu. ft.

The blown cellular bottles and other hollow shapes which may be formed according to this invention have a number of advantages over similar shapes prepared from unexpanded polypropylene. The saving in weight is of considerable economic advantage, both in the quantity of plastic employed and in reduced shipping and handling costs. The cellular structure also markedly improves the impact strength of the polypropylene and thus overcomes the most serious deterrent to the use of this plastic in bottles. When hollow shapes such as bottles are used as containers for liquids, a predominantly closed cell structure, as obtained in this invention, is absolutely necessary to prevent leakage of the liquid and its vapors. Other advantages of these cross-linked expanded structures are their greater resistance to solvents and other characteristics which permit the packaging of a wider variety of products than would otherwise be possible and in their heat resistance which permits sterilization of containers for such uses as milk, pharmaceuticals, cosmetics, etc.

What I claim and desire to protect by Letters Patent is:

1. The process of producing hollow articles of polypropylene foam which comprises extruding a mixture of a stereoregular polypropylene, a blowing agent, and an azido cross-linking agent, at a temperature above the softening temperature of the mixture and sufficient to release the gas from the blowing agent and to effect cross-linking of the polypropylene, into a parison and blowing said parison into a hollow mold.

2. The process of claim 1 wherein the azido cross-linking agent is a poly(sulfonazide).

3. The process of claim 2 wherein the poly(sulfonazide) is an aliphatic poly(sulfonazide).

4. The process of claim 3 wherein the aliphatic poly(sulfonazide) is 1,10-decane-bis(sulfonazide).

5. The process of producing hollow articles of polypropylene foam which comprises extruding a mixture of a stereoregular polypropylene, azo bis(formamide), and 1,10-decane-bis(sulfonazide) at a temperature of from about 165° C. to about 275° C. into a parison and blowing said parison into a hollow mold.

6. The process of producing hollow articles of polypropylene foam which comprises extruding a mixture of a stereoregular polypropylene, azo bis(formamide), 1,10-decane-bis(sulfonazide) and an elastomer at a temperature of from about 165° C. to about 275° C. into a parison and blowing said parison into a hollow mold.

References Cited in the file of this patent

UNITED STATES PATENTS

| | | |
|---|---|---|
| 2,518,249 | Ott | Aug. 8, 1950 |
| 2,532,243 | Ott | Nov. 28, 1950 |
| 2,917,217 | Sisson | Dec. 15, 1959 |
| 2,953,817 | Miller et al. | Sept. 27, 1960 |
| 3,072,972 | Yokose | Jan. 15, 1963 |

FOREIGN PATENTS

| | | |
|---|---|---|
| 856,735 | Great Britain | Dec. 21, 1960 |